United States Patent

[11] 3,555,961

[72] Inventors Vladimir Ivanovich Vitushkin
ul. B. Sadovaya 60, kv.30;
Viktor Evseevich Koire, ul.
Sotsialistichesdaya 46, kv.21; Semen
Albertovich Pevzner, per. Nauchny 4,
kv.11; Alexandr Konstantinovich
Sidorenko, ul. Parizhskoi Kommuny 29,
kv.6; Evgeny Alexandrovich Matsegora, ul.
Katerinicha 14, kv.6; Vladimir Iosifovich
Eskin, ul. Sotsialisticheskaya 48, kv.6, all of
Kramatorsk, U.S.S.R.
[21] Appl. No. 770,028
[22] Filed Oct. 23, 1968
[45] Patented Jan. 19, 1971

[54] TOOTH-CUTTING MACHINE
2 Claims, 2 Drawing Figs.
[52] U.S. Cl. .................................................. 90/1, 90/9,
90/10, 90/13.9, 90/56; 77/64; 318/18
[51] Int. Cl. .................................................. B23f 1/06,
B23f 23/08

[50] Field of Search ............................................. 318/20.300,
20.260, 20.605, 20.132; 90/1, 9, 10, 56, 13.99;
51/(Inquired); 77/64

[56] References Cited
UNITED STATES PATENTS
330,510  1885  O'Gorman....................  90/9
3,113,488  12/1963  Davenport...................  90/1X
FOREIGN PATENTS
732,153  2/1943  Germany.....................  90/56

Primary Examiner—Gil Weidenfeld
Attorney—Waters, Roditi, Schwartz & Nissen

ABSTRACT: A machine for cutting spur gear teeth includes a workpiece supporting a power head for adjustable movement. A tool carriage is mounted on the power head and a motor drive is provided to move the power head. An indexing device is supporting on the workpiece and includes at least one optical signal source. A receiver is arranged on the power head and is coupled with the motor drive for imparting indexing movement to the power head.

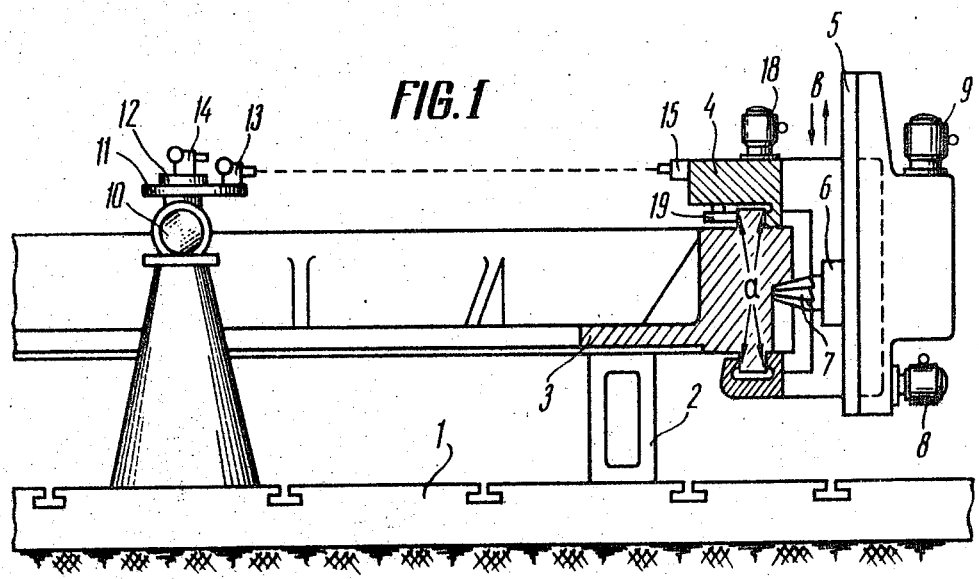
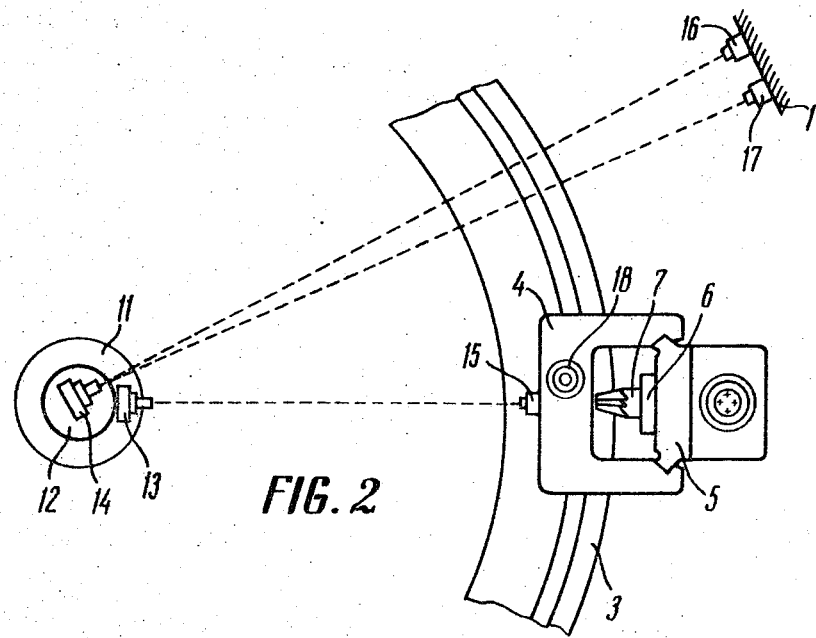

TOOTH-CUTTING MACHINE

This invention relates to tooth-cutting machines and more specifically to tooth-cutting machines intended preferably for cutting teeth of spur gears by a copying method.

The invention can be most effectively used in the machining of the spur gears having a diameter of 12 $m$ and more.

Known in the art are tooth-cutting machines preferably for cutting the teeth of spur gears by the copying method.

The conventionally known machines comprise an appliance for positioning a workpiece, said appliance having the shape of a turntable, a power head whose housing accommodates a rest with a spindle and cutting tool, and an indexing device installed coaxially with the workpiece and having a drive.

The indexing device of these machines comprises a worm-and-gear pair in which the worm wheel is coupled to the turntable which carries the workpiece arranged coaxially with the worm wheel.

Consequently, the rotary motion being indexed is imparted to the workpiece by means of the worm-and-gear pair, the power head being installed on a fixed column.

A disadvantage of the conventionally known machines is that their overall dimensions and weight are determined by the size of the workpieces to be processed.

This is caused by the fact that, in the case of conventionally constructed machines, the base parts (for example, the turntable) must have the dimensions commensurable with those of the workpiece to be machined, and must correspond to the latter as regards the load capacity, rigidity, etc.

When processing large-size gears (diameter 6—12 $m$ and above) having, accordingly, a heavy weight, the indexing devices of the conventionally known tooth-cutting machines are subjected to considerable stresses which in turn cause intensive wear of the worm-and-gear pair.

Rotation of the workpiece and the installation of the power head independently of the workpiece reduced the rigidity of the workpiece-tool system and adversely affect the accuracy of machining and the cutting duty.

Due to the above mentioned disadvantages of the conventionally known tooth-cutting machines, the processing of gear wheels with a diameter in excess of 12 $m$ presents a problem which cannot be readily solved.

An object of this invention is to provide such a tooth-cutting machine which, while having a simpler design and construction and a reduced weight, as compared to the conventional machines of this type, would ensure the machining of the teeth, preferably of spur gears, of practically unrestricted diameter.

Another important object of this invention is to provide such a machine which would be reliable and convenient in operation.

In compliance with the above-mentioned and other objects of the invention, a tooth-cutting machine, used preferably for cutting teeth of spur gears by a copying method, comprises an appliance for positioning a workpiece, a power head whose housing accommodates a tool rest with the spindle carrying a cutting tool, and an indexing device installed coaxially with the workpiece and having a drive. The indexing device is provided with at least one source of beams, preferably light beams, while the receiver of said beams is mounted on the housing of the power head for performing indexed movement on the workpiece fastened to a fixed appliance intended to carry the workpiece. The receiver is electrically coupled in a conventional manner with a motor on the power head for moving the power head relative to the workpiece.

When machining gear wheels of the extra-precision class, the indexing device should preferably be provided with two sources of light beams. Such being the case, one of said sources is optically connected to the receiver located on the power head, while the second source is alternately connected to one of two receivers installed on the appliance carrying the workpiece, said receivers being spaced from each other at a distance corresponding to the pitch of the gear teeth.

Owing to this design the present invention ensures the processing of gear wheels of a practically unrestricted diameter despite the light weight of the machine proper, a highly rigid workpiece-tool system, and a high precision of tooth cutting and high cutting parameters.

Moreover, the present invention is convenient and reliable in operation.

The specific features and advantages of the invention will appear more completely from the following description of a typical embodiment thereof which is given by way of example with reference to the accompanying drawings in which:

FIG. 1 is a diagram of the tooth-cutting machine, according to the invention, shown complete with the workpiece (presented in partly sectioned view);

FIG. 2 is a diagram showing the layout of the sources of light beams used in the indexing device and the position of beam receivers, according to the invention.

The machine according to this invention comprises an appliance for the installation of a workpiece, said appliance having the shape of a fixed stand plate 1 (FIG. 1) with a set of tubular supports 2 and clamping elements (not shown in the drawing) for securing the workpiece 3 in position.

The face surfaces of the workpiece 3 have projections with concentrically disposed lateral faces $a$ serving as guides upon which the power head housing 4 bears by its base plates (omitted in the drawing).

The power head housing 4 accommodates a tool rest or carriage 5 which carries a spindle 6 with a working tool 7.

In the embodiment of the invention described herein a pin-type cutter is used as a working tool.

The tool rest 5 has a drive with an electric motor 8 which ensures the feed of the spindle 6 (along arrow $b$), which in turn, has a drive with an electric motor 9 which rotates the working tool 7.

In the machine according to the invention the workpiece 3 is fixed on the stand plate 1, while the indexing movement in the course of tooth cutting is performed by the power head actuated by the drive of the indexing device.

The indexing device comprises an optical indexing head 10 arranged coaxially with the workpiece 3, said optical indexing head having turnable platforms 11 and 12 which are coaxial and interlocked and carry, respectively, two sources of light beams which are modulated luminous fluxes, a receiver 15 of one of said light sources being located on the power head housing 4, two receivers 16 and 17 of the other light source (FIG. 2), being mounted on the plate 1, the distance between them corresponding to the pitch of the gear teeth, said indexing device also comprising a drive with an electric motor 18 (FIG. 1) ensuring the indexing movement of the power head.

As a source and receiver of the light beams it is desirable to use an instrument emitting two identical modulated luminous fluxes with the modulations phase displaced through 180°, the position of the vertical plane of division between said fluxes in relation to the optical receiver being registered with the aid of commercially available electronic devices and an instrument with the readout starting point located in the center of the dial.

The machine according to this invention functions as follows.

The workpiece 3 is fixed on the stand plate 1, and the power head is mounted on the workpiece.

The installation of the power head directly on the workpiece, when said power head is optically connected to the indexing head 10, permits to machine gear wheels of a practically unrestricted diameter.

When use is made of only one source of luminous flux in conjunction with a receiver located on the power head, by rotating the turnable platform 11 of the optical indexing head 10 the luminous flux generated by the source 13 is directed towards the receiver 15 of the power head in such a way that the reading instrument registers the commencement of the readout.

On completion of these operations the working tool 7 which is essentially a pin-type cutter machines the tooth space of the gear wheel first tooth, the feed of said working tool caused by the movement of the tool rest 5 can be directed either upwards or downwards, as desired.

After machining the space of the first tooth, the turnable platform 11 of the optical indexing head 10 together with the luminous flux source 13 is turned through the angle corresponding to the tooth pitch. Concurrently, the power head is unlocked and, with the aid of the electric motor 18 of the indexing drive, said motor, actuating the roller 19 held to the surface of the lateral faces $a$ of the workpiece 3, is shifted to the next working position corresponding to the new position of the beam, which is registered by the receiver 15, after which the power head is locked again.

In this position the next working cycle identical to that described above takes place again.

The fact that the power head at the moment of the gear tooth machining is installed directly on the workpiece ensures a much greater rigidity of the workpiece-tool system and contributes to a higher precision of machining and higher operating parameters.

All the processes mentioned above can be automated by any means known to those skilled in the art.

When two sources of modulated luminous flux are used, the indexing device functions as follows.

The luminous flux generated by the source 13 is directed towards the receiver 15 of the power head, while the luminous flux generated by the source 14 is directed towards the receiver 16 (FIG. 2) located on the stand plate 1.

Further, the turnable platforms 11 and 10 of the optical indexing head 10 are locked in position to prevent them form turning in relation to each other, said platforms mounting the respective sources of the luminous fluxes.

The turnable platforms 11 and 12 are turned together in such a way that their mutual position is not changed, and the luminous flux generated by the source 14 is directed towards the receiver 17 (FIG. 2).

In this case, the luminous flux generated by the source 13 turns through the angle corresponding to the tooth pitch.

The process of unlocking the power head and its shifting to the position corresponding to the new position of the source of the luminous flux, as well as the subsequent machining of the tooth is carried out exactly as described above.

Thereafter, the turnable platforms 11 and 12 are unlocked and, without changing the position of the source 13, the source 14 is returned to the initial position in which its luminous flux is directed towards the receiver 16.

On the completion of machining the tooth space, the process of indexing and subsequent movement takes place again as described above.

The accuracy of the indexing process described above is very high because the distance between the two receivers 16 and 17 can be maintained with an error of as little as 0.01 mm and less, as the receiver is located in a point with a radius which is longer than that of the gear wheel, the error for the circular pitch of the teeth will be, accordingly, still smaller.

The employment of the machine according to this invention renders unnecessary the manufacture of large-size expensive tooth-cutting machines of the conventionally known design for cutting teeth of large-diameter spur gears, and provides for the machining of teeth of the gears of a practically unrestricted diameter. In this case, the overall dimensions of the machine according to this invention do not depend upon the size of the wheels to be machined.

The indexing device of the machine according to this invention has no rigid connection to the power head and is not subjected to the effect of the workpiece weight or the cutting forces, neither is it subjected to any distortion or intensive wear and, consequently, can maintain a high degree of accuracy during a long period of time.

By virtue of its small overall dimensions, the machine according to this invention ensures a high rigidity of the workpiece-tool system because the latter presents a closed power contour in the shape of the power head fastened directly to the workpiece in the cutting zone.

This ensures a much higher accuracy of machining and provides the possibility of the intensification of the operating parameters and procedures.

The machine according to this invention permits the use of precision indexing heads as an integral part of the indexing device, which additionally contributes to a higher accuracy of gear wheel machining.

The employment of the indexing device with two sources of light beams ensures a high accuracy of a circular pitch irrespective of the size of the gear wheel, which allows machining high-precision gear wheels of a practically unrestricted diameter.

We claim:

1. A gear cutting machine for cutting spur teeth on a circular workpiece, said gear cutting machine comprising means for supporting said workpiece in a prescribed position, a power head supported by said workpiece, said power head including a tool carriage, means for moving said tool carriage relative to said workpiece, said tool carriage including a spindle for supporting a working tool, means on said power head cooperating with a portion of said workpiece for driving the power head along the periphery of the workpiece, indexing means for controlling an increment of movement of said power head including an indexing head supported coaxially with the workpiece and a signal source mounted on the indexing head and receiver means mounted said power head for receiving signals from said signal source, said means for driving said power head being actuated by said receiver means in response to received signals.

2. A gear cutting machine as claimed in claim 1 wherein said indexing means also includes a further signal source, each of said signal sources including means for transmitting optical beams, said indexing means further including a pair of receiver means supported on said means supporting said workpiece, said pair of receiver means being spaced from one another at a distance equal to a reduced circular pitch of said gear teeth, and optically coupled with said further signal source.